US009695090B2

(12) United States Patent
Hasanovic et al.

(10) Patent No.: US 9,695,090 B2
(45) Date of Patent: *Jul. 4, 2017

(54) COMPOSITE MATERIAL COMPRISING A PRECIOUS METAL, MANUFACTURING PROCESS AND USE OF SUCH MATERIAL

(71) Applicant: HUBLOT SA, GENÈVE, Genève (CH)

(72) Inventors: Senad Hasanovic, Lausanne (CH); Andreas Mortensen, St-Saphorin/Morges (CH); Ludger Weber, Le Mont /s Lausanne (CH); Reza Tavangar, Tehran (IR)

(73) Assignee: HUBLOT SA, Nyon (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/755,729

(22) Filed: Jun. 30, 2015

(65) Prior Publication Data
US 2016/0060180 A1    Mar. 3, 2016

Related U.S. Application Data

(62) Division of application No. 14/003,040, filed as application No. PCT/EP2011/053494 on Mar. 8, 2011, now Pat. No. 9,096,917.

(51) Int. Cl.
| B32B 3/00 | (2006.01) |
| C04B 41/45 | (2006.01) |
| C04B 35/563 | (2006.01) |
| C04B 41/00 | (2006.01) |
| C04B 41/88 | (2006.01) |
| C22C 32/00 | (2006.01) |
| B22D 19/00 | (2006.01) |
| C22C 5/02 | (2006.01) |
| A44C 27/00 | (2006.01) |
| B22F 3/10 | (2006.01) |

(52) U.S. Cl.
CPC ........ *C04B 41/4523* (2013.01); *A44C 27/003* (2013.01); *B22D 19/00* (2013.01); *B22F 3/10* (2013.01); *C04B 35/563* (2013.01); *C04B 41/009* (2013.01); *C04B 41/88* (2013.01); *C22C 5/02* (2013.01); *C22C 32/00* (2013.01); *C22C 32/0057* (2013.01); *Y10T 428/249994* (2015.04)

(58) Field of Classification Search
CPC . C04B 41/4523; C04B 41/88; C04B 35/5805; C22C 5/02; C22C 5/04; C22C 32/0073
See application file for complete search history.

(56) References Cited

U.S. PATENT DOCUMENTS

| 3,901,717 | A | * | 8/1975 | Revaz | A44C 17/00 |
| | | | | | 428/539.5 |
| 4,585,618 | A | * | 4/1986 | Fresnel | C04B 35/65 |
| | | | | | 204/242 |
| 5,753,574 | A | * | 5/1998 | Donaldson | C04B 41/009 |
| | | | | | 501/96.3 |
| 2006/0086441 | A1 | * | 4/2006 | Lin | C22C 32/0052 |
| | | | | | 148/678 |

* cited by examiner

*Primary Examiner* — Elizabeth Mulvaney
(74) *Attorney, Agent, or Firm* — Miller, Matthias & Hull LLP

(57) ABSTRACT

A composite material combining—a precious metal or an alloy containing a precious metal—and a boron-based ceramic having a melting point greater than that of said precious metal and a density at most equal to 4 g/cm3.

20 Claims, 2 Drawing Sheets

Manufacture of the preform

Fill a flexible mold at room temperature with the boron carbide power

Manufacture of the preform

Fill a flexible mold at room temperature with the boron carbide power

Isostatically press at 200 MPa at room temperature.

Remove the compact from the mold.

Sinter until the desired density is obtained while preserving the interconnected porosity Infiltration Infiltrate the liquid metal into the preform by applying gas pressure

COMPOSITE MATERIAL COMPRISING A PRECIOUS METAL, MANUFACTURING PROCESS AND USE OF SUCH MATERIAL

CROSS-REFERENCE TO RELATED APPLICATIONS

This application is a continuation under 35 USC §120 of co-pending U.S. patent application Ser. No. 14/003,040, filed Sep. 4, 2013, which is a USC §371 national phase filing of International Patent Application No. PCT/EP2011/053494 filed on Mar. 8, 2011.

FIELD OF THE DISCLOSURE

The invention pertains to composite materials comprising precious metals, their manufacturing process and their uses.

BACKGROUND OF THE DISCLOSURE

Document U.S. Pat. No. 7,608,127 describes composite materials consisting of a metallic matrix of precious metals or precious metal alloys, reinforced with a filler material of tungsten carbide or molybdenum carbide. During its manufacture, this composite material is obtained by infiltration of the liquid metal, under pressure, in a preform of tungsten carbide or molybdenum carbide. The composite material described in this document may have a metal concentration ranging from 56 to 75% by weight and a hardness greater than 171 VHN, possibly exceeding 500 VHN.

SUMMARY OF THE DISCLOSURE

The primary object of the present invention is to propose a new composite material having characteristics at least as advantageous, if not better, than the prior art described above. To that end, the invention proposes a composite material combining:
  a precious metal or an alloy containing a precious metal (the alloy in question can be, for example, an alloy of precious metals with one another and/or with other metals such as aluminum, copper, and titanium),
  and a boron-based ceramic having a melting point greater than that of said precious metal and a density at most equal to 4 g/cm$^3$.

We thereby obtain a composite material of low density, through the choice of the boron-based ceramic, and considerable hardness. In spite of the very low wettability of boron-based ceramics, the composite material can be realized primarily by liquid metal infiltration under pressure.

In various embodiments of the composite material according to the invention, we can advantageously have recourse to one and/or the other of the following arrangements:
  the composite material has a precious metal concentration greater than 75% by weight of the total weight of said material;
  the said precious metal is chosen from among: gold, platinum, palladium, and silver;
  the said precious metal is gold;
  the ceramic is combined with an alloy of gold or aluminum, the composite material having a concentration of aluminum at most equal to 20% by weight of the total weight of the composite material, preferably at most equal to 5% by weight of the total weight of the composite material;
  the precious metal is alloyed to titanium, the concentration of titanium being comprised between 0.5 and 2% of the total weight of the composite material, advantageously approximately 1% by weight of the total weight of the composite material, which facilitates infiltration of the precious metal or alloy in the ceramic;
  said ceramic is chosen from among: a boron carbide, a boron nitride, a boron oxide, and a BCN heterodiamond;
  said ceramic is chosen from the boron carbides having as their approximate formula $B_4C$, $B_{13}C_2$, and $B_{12}C_3$;
  said ceramic is a boron nitride having the formula BN, chosen from among: cubic boron nitride, boron nitride having a Wurtzite type crystalline structure, hexagonal boron nitride;
  said ceramic is boron oxide $B_6O$;
  said ceramic is cubic $BC_2N$;
  said ceramic is an electrical conductor, which allows the composite material to be machined by electrical discharge machining;
  the material has a hardness greater than 320 VHN, preferably greater than 400 VHN;
  the ceramic represents a volume fraction comprised between 55 and 80% of said material;
  the ceramic is in the form of discrete particles having an equivalent diameter comprised between 0.1 μm and 1 mm, preferably comprised between 1 μm and 100 μm;
  the ceramic forms a continuous, interconnected phase;
  the composite material has a density generally comprised between 7 and 14 g/cm$^3$.

Another object of the invention is a process to manufacture a composite material as defined above, said process having an infiltration step in which the precious metal or alloy is infiltrated under a pressure of 10 to 200 bar, preferably from 75 to 150 bar, in a porous preform consisting of said ceramic.

As indicated above, infiltration under pressure allows the metal to infiltrate the boron-based ceramic in spite of the very low wettability of this type of ceramic. Additionally, we thereby obtain a composite material appreciably without porosity.

In various embodiments of the process according to the invention, we can have recourse to either of the following situations:
  during the infiltration step, an alloy of gold and aluminum in liquid form is infiltrated under pressure in a porous preform of boron carbide;
  the process also comprises, prior to the infiltration step, a sintering step during which the ceramic preform is at least partially sintered.

Finally, another object of the invention is the use of a composite material as described above in clock making or jewelry making.

BRIEF DESCRIPTION OF THE DRAWINGS

Other characteristics and advantages of the invention will appear from the following description of one of the embodiments, provided with respect to the attached drawings, in which.

DETAILED DESCRIPTION

Figure 1:
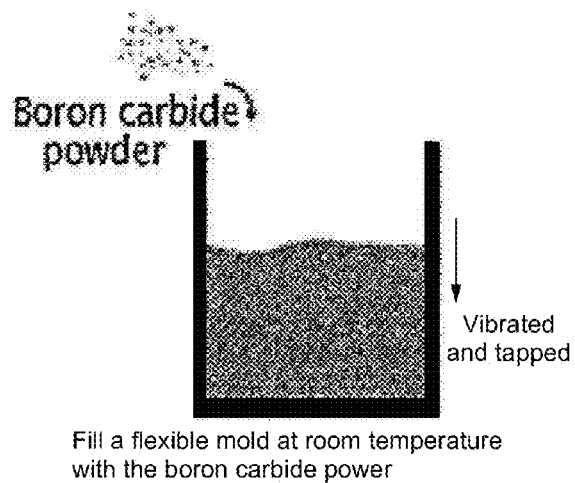
FIGS. 1-5 collectively illustrate a schematic of example steps of manufacturing a composite material according to an embodiment of the invention.
Figure 2:
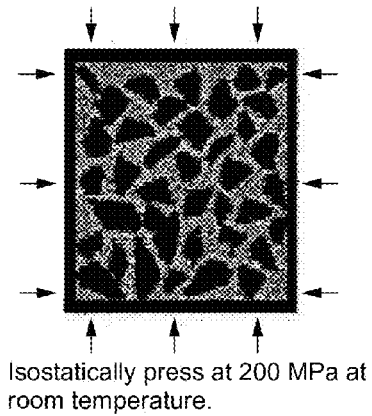
Figure 3:
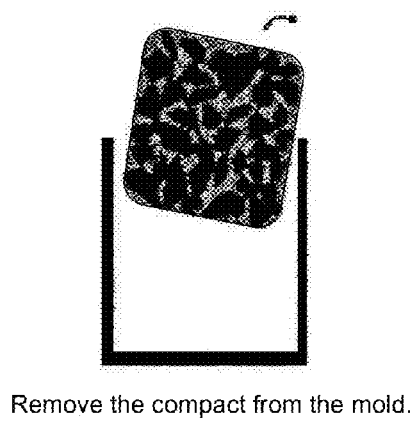

As explained above, the invention pertains to a composite material combining:

a precious metal (notably: gold, platinum, palladium, or silver) or an alloy containing a precious metal;

and a boron-based ceramic with a melting point greater than that of said precious metal and a density at most equal to 4 g/cm³ (preferably less than 3.5 g/cm³).

Concerning the aforementioned alloys, it may, notably, involve:

an alloy of gold or aluminum, the composite material having a concentration of aluminum at most equal to 20% by weight of the total weight of the composite material, preferably at most equal to 5% by weight of the total weight of the composite material;

alloys comprising at least one precious metal and at least titanium to facilitate the infiltration of the metal into the ceramic (the concentration of titanium being comprised between 0.5 and 2% of the total weight of the composite material, preferably approximately 1% by weight of the total weight of the composite material);

alloys comprising at least one precious metal and at least copper.

The composite material may have a precious metal concentration greater than 75% by weight of the total weight of said material, for example on the order of 80%.

The technical ceramics here referred to are hard, refractory, lightweight materials, and very stable chemically. Their melting point is generally above 2000 degrees Celsius. The ceramics that can be used for the present invention notably comprise:

boron carbides having an approximate formula $B_4C$, $B_{13}C_2$, and $B_{12}C_3$ (melting point: 2450° C., density 2.48-2.51 g/cm³), the boron nitrides, BN (density: approximately 3.5 g/cm³), notably cubic boron nitride (melting point: 2970° C.), boron nitride with a Wurtzite type crystalline structure (melting point: 1700° C.), hexagonal boron nitride (melting point: approximately 2500° C.), certain boron oxides, notably boron oxide $B_6O$ (melting point: greater than 2000° C.), certain BCN compounds, notably cubic $BC_2N$ (melting point greater than 2000° C.).

The ceramic may represent a volume fraction comprised between 55 and 80% of the material. It can be in the form of discrete particles having an equivalent diameter comprised between 0.1 μm and 1 mm, preferably comprised between 1 m and 100 μm. It may be advantageous to have particles of various sizes in the same material, notably to obtain a spangled visual effect.

When the process of preparing the composite according to the invention comprises a sintering step, the ceramic then forms a continuous phase in which the ceramic grains are interconnected. The chosen ceramic will preferably be sufficiently electrically conductive to enable the use of electrical discharge machining. In particular, this is the case with the boron carbide having the statistical formula $B_4C$. We can thus easily machine the composite material in spite of its extreme hardness.

We thereby obtain a material that is both light (low density) and very hard, therefore, nearly unscratchable, characterized by a hardness greater than 320 VHN, preferably greater than 400 VHN, or even much higher. This latter property is particularly interesting, notably for the use of composite materials in clockmaking or jewelry making.

We can realize the material described below notably by the process illustrated in FIGS. 1-5, comprising the following steps:

fabrication of a porous ceramic preform, notably by sintering;

infiltration under pressure of the precious metal or alloy into the ceramic preform.

EXAMPLE

Figure 4:
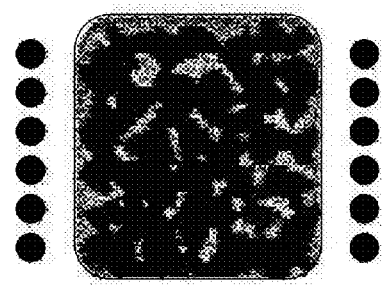

A commercial boron carbide powder, F1000 (particle size 5 μm), of statistical formula $B_4C$, has been cold compacted at 200 MPa isostatic pressure (FIGS. 1-3), then sintered at 2100° C. in an oven, under vacuum, for 1 hour (FIG. 4).

The density of the sintered preform is 1.766 g/cm³ and the density of the powder is 2.48 g/cm³. Thus, the preform is 71.19% dense, leaving 28.81% porosity.

Figure 5:
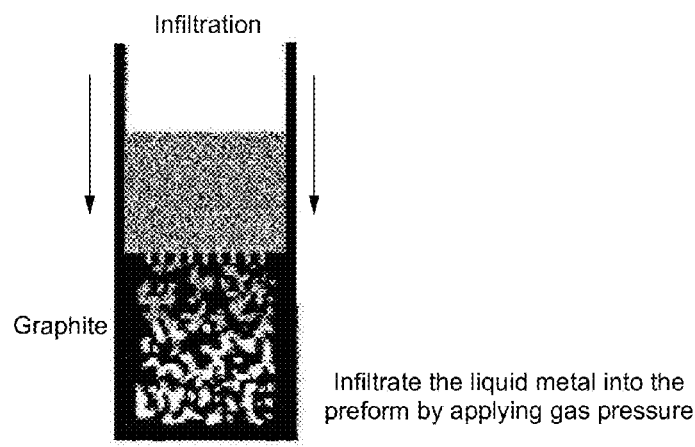

Pure gold is then infiltrated in the sintered preform at a temperature of 1200° C. under 150 bar gas (argon) pressure (FIG. 5).

Figure 6:
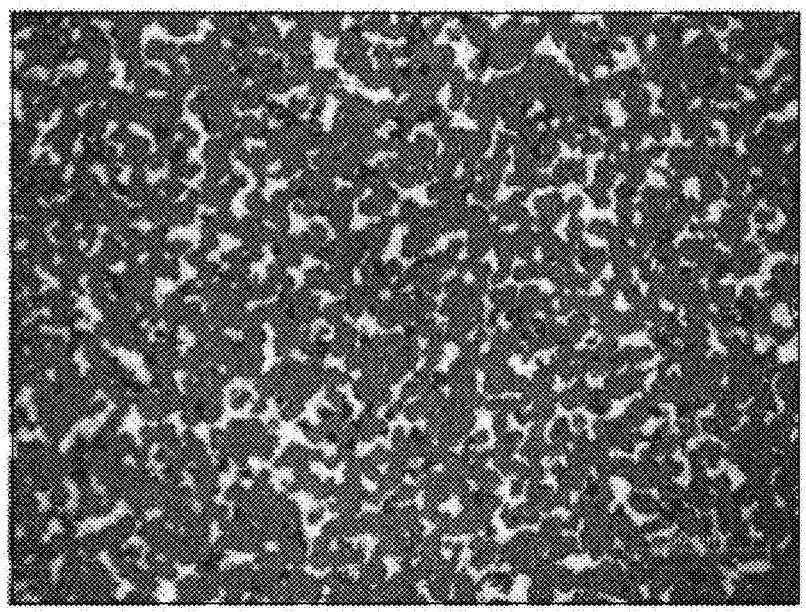
FIG. 6 is a photo of a crystallographic section showing a composite material according to an embodiment of the invention.

The material obtained is a metal-matrix composite having a density of 7.48 g/cm³. The concentration of pure gold in the composite is greater than 76% by mass and its hardness is comprised between 650 and 700 Vickers (30 N load, 16 seconds). The crystallographic section shown in FIG. 6 was made with an optical microscope at 50× enlargement on a sample of said composite, polished with diamond particles up to 0.25 μm. The bright regions correspond to the metal infiltrated in the ceramic.

The invention claimed is:

1. A composite material containing a precious metal chosen among gold and platinum,
    wherein said composite material has a concentration of precious metal greater than 75% by weight of the total weight of said material,
    and wherein said composite material has a density comprised between 7 and 14 g/cm³.

2. The composite material according to claim 1, in which said precious metal is gold.

3. The composite material according to claim 1, in which the precious metal is alloyed to titanium, the concentration of titanium being comprised between 0.5 and 2% of the total weight of the composite material, preferably approximately 1% by weight of the total weight of the composite material.

4. The composite material according claim 1, having a hardness greater than 320 VHN, preferably greater than 400 VEIN.

5. The composite material according to claim 1, wherein said precious metal is combined with a boron-based ceramic, said boron-based ceramic having a melting point greater than that of said precious metal and a density at most equal to 4 g/cm³.

6. The composite material according to claim 5, in which the ceramic is combined with an alloy of gold and aluminum, the composite material having a concentration of aluminum at most equal to 5% by weight of the total weight of the composite material.

7. The composite material according to claim 5, in which said ceramic is chosen from among: a boron carbide, a boron nitride, a boron oxide, and a BCN heterodiamond.

8. The composite material according to claim 7, in which said ceramic is chosen from among the boron carbides having as an approximate formula $B_4C$, $B_{13}C_2$, and $B_{12}C_3$.

9. The composite material according to claim 7, in which said ceramic is boron nitride having the formula BN, chosen from among: cubic boron nitride, boron nitride with a Wurtzite type crystalline structure, hexagonal boron nitride.

10. The composite material according to claim 7, in which said ceramic is boron oxide $B_6O$.

11. The composite material according to claim 7, in which said ceramic is cubic $BC_2N$.

12. The material according to claim 5, in which said ceramic is an electrical conductor.

13. The composite material according to claim 5, in which the ceramic represents a volume fraction comprised between 55 and 80% of said material.

14. The composite material according to claim 5, in which the ceramic is in the form of discrete particles having an equivalent diameter comprised between 0.1 µm and 1 mm, preferably comprised between 1 µm and 100 µm.

15. The composite material according to claim 5, in which the ceramic forms a continuous, interconnected phase.

16. The composite material according to claim 1, wherein said precious metal is combined with a porous ceramic preform.

17. A process for manufacturing a composite material according to claim 16, said process having an infiltration step in which the precious metal or alloy is infiltrated under a pressure of 10 to 200 bar, preferably from 75 to 150 bar, in said porous ceramic preform.

18. The process according to claim 17, in which, during the infiltration step, an alloy of gold and aluminum in liquid form is infiltrated under pressure in said porous ceramic preform, and said porous ceramic preform is made of boron carbide.

19. The process according to claim 17, also comprising, prior to the infiltration step, a sintering step during which the ceramic preform is at least partially sintered.

20. Use of a composite material according to claim 1 in clock making or jewelry making.

\* \* \* \* \*